United States Patent [19]
Quinif

[11] 3,782,051
[45] Jan. 1, 1974

[54] WINDOW SHUTTER CONSTRUCTION
[75] Inventor: Edward G. Quinif, Richmond, Ind.
[73] Assignee: Walled Lake Door Company, Richmond, Ind.
[22] Filed: June 21, 1972
[21] Appl. No.: 264,738

[52] U.S. Cl.................. 52/473, 52/314, 52/475, 52/623
[51] Int. Cl............................ E06b 7/08, E06b 9/00
[58] Field of Search.................... 52/314, 473, 474, 52/475, 494, 497, 623, 624, 620, 627, 628

[56] References Cited
UNITED STATES PATENTS

| | | | |
|---|---|---|---|
| 3,461,629 | 8/1969 | Smith | 52/314 |
| 1,815,940 | 7/1931 | Zoerner | 52/623 |
| 3,548,555 | 12/1970 | Trostle et al. | 52/314 X |
| 3,336,711 | 8/1967 | Menke | 52/473 X |
| 1,731,131 | 10/1929 | Hall | 52/623 X |
| 3,055,467 | 9/1962 | Peek et al. | 52/473 X |
| 3,287,854 | 11/1966 | Dasovic et al. | 52/309 X |
| 3,364,643 | 1/1968 | Smith et al. | 52/473 X |

Primary Examiner—John E. Murtagh
Assistant Examiner—John R. Masterman
Attorney—Charles R. Rutherford

[57] ABSTRACT

A window shutter construction comprising a mounting frame and a shutter affixed as by clips in overlying relation to the mounting frame so as to conceal the mounting frame when the shutter is viewed from the front.

1 Claim, 7 Drawing Figures

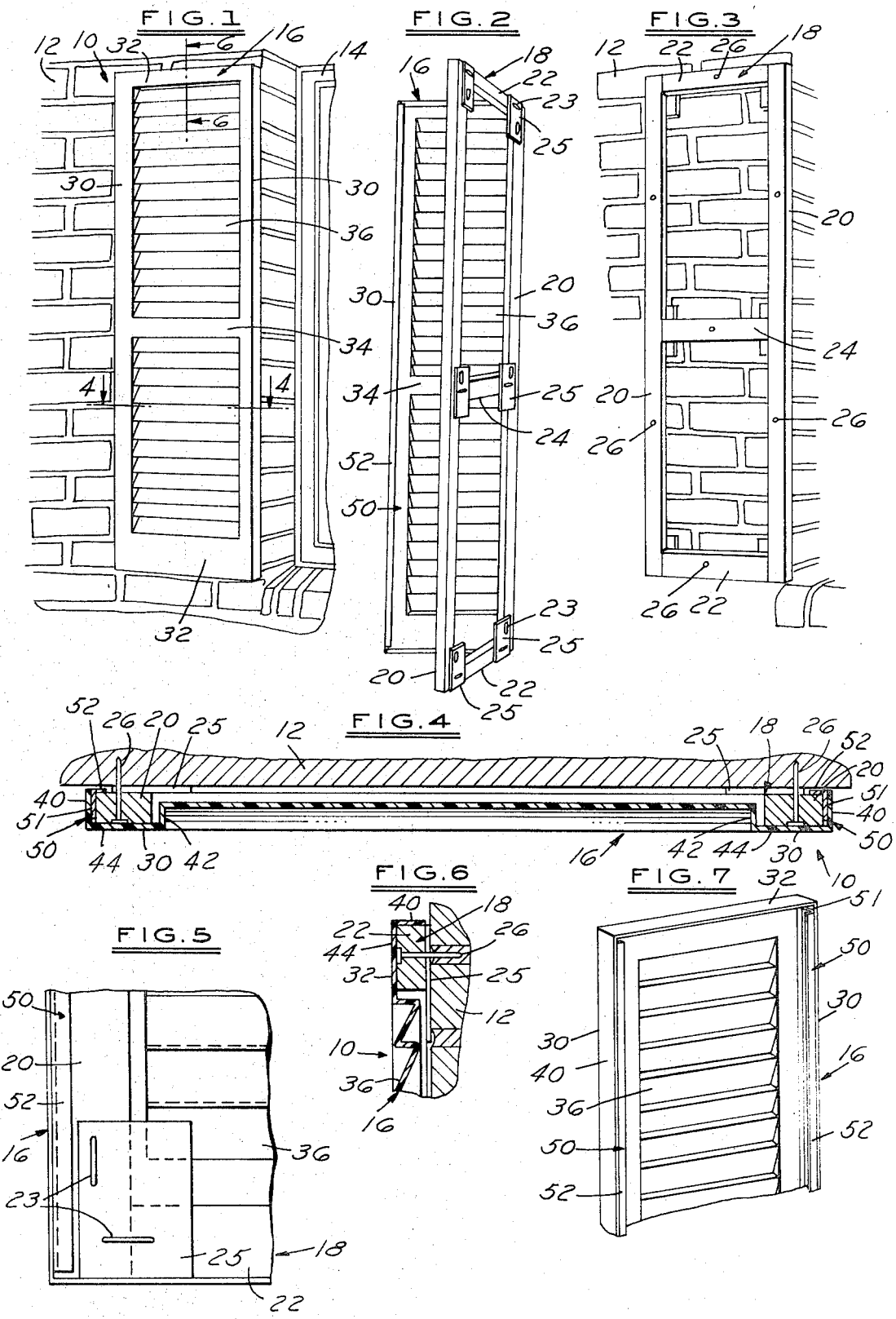

WINDOW SHUTTER CONSTRUCTION

BACKGROUND AND SUMMARY OF THE INVENTION

In the past it has been difficult to mount a window shutter on the wall of a building in exactly the position desired. There has also been the problem of concealing the nails or like fastening devices used to mount the shutter.

In accordance with the present invention, the shutter construction includes a mounting frame separate from and in addition to the shutter proper. The mounting frame is of substantially the same length and width as the shutter proper and is first mounted on the wall of the building by the use of nails or like fasteners in precisely the desired position. The shutter proper is then applied over the face of the mounting frame and secured thereto as by clips so as to conceal the mounting frame when the shutter is viewed from the front. Preferably the rear surface of the shutter proper is recessed to receive the mounting frame in a manner such that the mounting frame is completely covered even along the side edges. In a sense the mounting frame becomes a core for, and hence a part of, the shutter.

Any adjustments that need to be made in the position of the shutter are made when securing the mounting frame in place before the shutter proper is applied. Any slight defacing of the mounting frame resulting from nailing or renailing it to the building wall in adjusted position presents no problem at all because the mounting frame is covered over by the shutter proper in the final assembled condition of the parts.

In a preferred construction of the invention, the sides and ends of the shutter are in the form of rearwardly opening channels which substantially fully receive the side and end bars of the mounting frame.

Since no fasteners show on the surface of the mounted shutter, it obviously may be painted before it is installed. There is no problem of covering up the nails because they are not visible.

Other objects and features of this invention will become apparent as the description proceeds, especially when taken in conjunction with accompanying drawing, wherein:

FIG. 1 is a perspective view of a window shutter construction made in accordance with the invention, shown mounted on the wall of a building alongside the window.

FIG. 2 is a perspective view illustrating the mounting frame and shutter from the rear, with the mounting frame swung away from the shutter at one edge.

FIG. 3 is a perspective view similar to FIG. 1 showing the mounting frame secured to the building wall but with the shutter removed.

FIG. 4 is a sectional view taken on the line 4—4 in FIG. 1.

FIG. 5 is a fragmentary elevational view of a corner of the mounting frame and shutter as viewed from the back.

FIG. 6 is a fragmentary sectional view taken on the line 6—6 in FIG. 1.

FIG. 7 is a fragmentary sectional view of a portion of the shutter as viewed from the back.

Referring now more particularly to the drawing and especially to FIG. 1, the shutter construction or assembly is generally designated 10 and is shown mounted in vertical position on the wall 12 of a building alongside a window 14. The shutter construction 10 comprises the shutter proper 16 and the mounting frame 18.

The mounting frame 18 may be made of any suitable material such as wood, for example, and is in the form of a flat open rectangular frame having the spaced parallel side bars 20 and the spaced parallel end bars 22 connected end to end by staples or like fasteners 23 which also secure the pads or spacers 25 to the rear surface of the frame at the corners. Such pads 25 may be of any suitable material such, for example, as plastic or wood and serve to space the mounted frame from the building wall as more fully described hereinafter. The mounting frame is further reinforced by a transverse intermediate bar 24 parallel to end bars 22 and terminally connected to the side bars 20. All of the bars 20, 22 and 24 making up the mounting frame lie in a common plane so that the mounting frame may be mounted on the wall 12 substantially parallel with the face of the wall but spaced slightly therefrom by pads 25 as viewed in FIGS. 4 and 6. The front faces of the bars 20, 22 and 24 are flat and also lie in a common plane. The mounting frame may be secured to the face of the wall by nails 26.

The rectangular shutter proper is in the form of a thin rectangular sheet preferably of plastic molded or shaped to fit over the shutter frame 18 as a cover or skin to simulate an ordinary shutter. A suitable plastic from which the shutter may be formed is an acrylonitrile-butadiene styrene treated with acrylic. The plastic sheet is flexible to facilitate its being fitted over the frame 18 and may have a thickness on the order of about 0.040 inches.

As stated, the plastic sheet is molded or shaped to simulate a shutter. Thus its sides and ends 30 and 32 simulate the ordinary side and end bars of a conventional shutter. The front face of the plastic sheet within the boundry of the sides and ends 30, 32 is formed to simulate ordinary louvers 36 which appear as parallel, inclined horizontal slats. The plastic sheet is preferably solid and inperforate over its entire extend and thus the louvers 36 are not louvers in the true sense but are only simulations thereof. The solid or imperforate structure of the plastic sheet prevents moisture from getting behind the shutter. The plastic shutter also has a simulated intermediate bar 34 flush with the sides and ends 30 and 32. The overall length and width of the shutter 16 is substantially the same as that of the mounting frame 18.

Referring to FIGS. 4, 6 and 7, it will be noted that the sides and ends 30 and 32 of the shutter 16 take the form of rearwardly opening channels having the side flanges 40 and 42 substantially at right angles to the channel base 44. The channel bases 44 are flat and lie in a common plane flush with the front face of the intermediate bar 34. These channels form a continuous recess around the entire shutter 16 and are somewhat wider than the side and end bars 20 and 22 of the mounting frame to receive the latter in the manner shown in FIGS. 4 and 5. The slight clearance facilitates mounting especially where small dimensional variations occur in the parts. It will be noted that the flanges 40 of the channels are of a length slightly greater than the thickness of the mounting frame bars to completely cover them and substantially cover spacers 25 when the shutter proper 16 is mounted on the mounting frame. In other words, when assembled, the bars and spacers of the shutter frame are substantially fully received in the channels of the shutter proper whith the front faces of the mounting frame bars 20 and 22 in substantially surface-to-surface contact with the channel bases 44 so that the bars of the mounting frame and substantially the full thickness of the spacers are not exposed along the side edges. When thus mounted, the flat rear surface of the intermediate bar 34 of the shutter is in substantially surface-to-surface contact with the flat front surface of the intermediate bar 24 of the mounting frame.

The shutter frame is mounted on the mounting frame by detent means here shown as being in the form of clips 50 on the flanges 40 of the sides 30 of the shutter. Clips 50 are elongated members and preferably are extruded from the same plastic material as the shutter proper 16. They are of right angle configuration having flanges 51 and 52, and extend for substantially the full length of the shutter. The flanges 51 of the clips are secured in surface-to-surface relation to the inner surfaces of the shutter flanges 40 by any suitable means as by fusing the parts together or by gluing. A suitable glue may be one having an adhesive base of a synthetic rubber and a vehicle comprising a blend of keytone, aromatic an aliphatic solvents. The flanges 52 extned laterally inwardly and are adapted to snap behind the side bars 20 of the mounting frame 18 when the shutter proper is applied thereto as in FIGS. 1 and 4. The shutter 16 has sufficient flexibility to allow the clips to snap around the frame 18. The pads 25 are disposed inwardly from the side edges of frame bars 20 far enough to clear and hence not interfere with clips 50. Pads 25 also space the mounting frame 18 from the building wall sufficiently to accommodate the flanges 52 of the clips.

The outer flanges 40 of the four channels of the shutter may in their free state condition be inclined inwardly at a small angle to channel bases 40 to hug or grip the end bars 22 of the mounting frame and to cause the clips 50 to hug or grip the side bars 20 and the clip flanges 52 to have pressure contact with the backs of bars 20.

In order to install the shutter construction of this invention, the mounting frame 18 is first secured in precisely the desired position on the wall of the building by driving nails 26 through the bars of the frame using as many nails as may be necessary to support the weight of the entire installation. Spacers 25 contact the wall and space the mounting frame therefrom. The shutter is then applied over the mounting frame 18 so that the side bars 20 of the mounting frame are received in the channels of the sides 30 of the shutter and the end bars 22 of the mounting frame are received in the channels of the ends 32 of the shutter. The shutter is flexed when applied to snap the clips 50 behind the side bars 20 of the mounting frame. When the shutter is thus mounted on the frame, the bases of the channels of the shutter will be held in contact with the front faces of the mounting frame bars and the simulated intermediate bar 34 of the shutter will be held in contact with the intermediate bar 24 of the mounting frame because of the pressure contact of clip flanges 52 with the backs of frame bars 20. The terminal edges of the flanges 40 of the channels of the shutter bars will fully overlap the sides of the mounting frame bars and will substantially overlap the spacers 25 to conceal them from view. Flanges 40 also conceal clips 50 because the flanges 52 are flush with the edges of flanges 40. The slight clearance between the terminal edges of flanges 40 and the building wall in the final assembled position prevents water from being trapped behind the shutter construction, while substantially concealing the spacers 25. The greater width of the channels of the shutter than the mounting frame bars facilitates the application of the shutter, while the slight angle of the channel flanges 40 causes them to securely grip the mounting frame bars.

It is apparent that the shutter construction of my invention is capable of rapid and sure installation and will have the same appearance as a conventional shutter although the mounting frame and all of the fastening elements are concealed. The spacers 25 together with fasteners 23 secure the frame bars of the mounting frame together. They also space the shutter assembly away from the building wall and thus more readily accommodate the assembly to irregularities in the wall. Such spacing of the shutter assembly also allows air to circulate behind the shutter assembly for quick drying after rain and also prevents water on the wall from contacting the shutter on its mounting frame. The spacers also take up dimensional variations in the plastic of the shutter and the wood of the frame.

Since the peripheral bars of the mounting frame 18 are fully received in the rearwardly opening channels of the plastic shutter, the mounting frame in effect becomes a shutter core for which said plastic sheet material becomes a shell or skin cover. The mounting frame or core provides a rigid support for the plastic sheet material. While this plastic sheet material is substantially self-supporting, it is of very thin gauge and hence benefits from the rigidifying effect of the mounting frame. As seen in FIGS 4 and 6, the bases 44 of the channels and the outer flanges 40 and clips 50 press firmly against the mounting frame for maximum support.

What I claim as may invention is:

1. A window shutter construction comprising a flat rectangular mounting frame having spaced parallel side bars and spaced parallel end bars connected in end to end abutting relation, said mounting frame being adapted to be secured to the wall of a building alongside a window, and a rectangular shutter in the form of a flexible plastic cover sheet of substantially the same length and width as said mounting frame, said plastic cover sheet having continuous elongated rearwardly opening channels along its sides and ends in which said frame bars are substantially fully received whereby said mounting frame becomes in effect a shutter core for said plastic cover sheet, spacer pads on the rear surface of said mounting frame to space said mounting frame from a building wall when mounted thereon, said spacer pads being provided at the corners of said frame across said abutting ends and secured thereto by fasteners, said fasteners and spacer pads cooperating to interconnect the ends of said side and end bars at the corners of said frame, the outer flanges of said channels of said plastic cover sheet being of a height slightly greater than the thickness of said frame bars but slightly less than the combined thickness of said frame bars and spacer pads so that said outer flanges completely cover and conceal said frame bars around the total periphery of said window shutter construction and substantially cover said spacer pads but leave a slight clearance between the terminal edges of said outer flanges and the wall of a building on which said window shutter construction is mounted with said spacer pads abutting said building wall to prevent the trapping of moisture while substantially concealing said spacer pads, and mounting clips on said outer flanges of the channels along the sides of said cover sheet having laterally inwardly directed flanges snapped behind said side frame bars to hold said cover sheet releasably mounted thereon, said clips being formed of the same flexible plastic material as said cover sheet and extending for substantially the full length of said cover sheet, said clips having mounting flanges at right angles to said inwardly directed flanges which are secured in surface to surface relation to the inner surfaces of said outer flanges of the channels along the sides of said cover sheet, said spacer pads being located so as to clear said inwardly directed flanges of said clips.

* * * * *